United States Patent
Kang et al.

(10) Patent No.: US 7,175,494 B1
(45) Date of Patent: Feb. 13, 2007

(54) FORMING CARBON NANOTUBES AT LOWER TEMPERATURES SUITABLE FOR AN ELECTRON-EMITTING DEVICE

(75) Inventors: Sung Gu Kang, San Jose, CA (US); Woo Kyung Bae, San Jose, CA (US); Jung Jae Kim, San Jose, CA (US)

(73) Assignee: cDream Corporation, San Jose, CA (US)

( * ) Notice: Subject to any disclaimer, the term of this patent is extended or adjusted under 35 U.S.C. 154(b) by 163 days.

(21) Appl. No.: 10/600,226

(22) Filed: Jun. 19, 2003

Related U.S. Application Data

(63) Continuation-in-part of application No. 10/226,873, filed on Aug. 22, 2002, now abandoned.

(51) Int. Cl.
*H01J 9/04* (2006.01)

(52) U.S. Cl. .................. 445/50; 445/51; 423/447.1; 423/447.3; 423/447.4

(58) Field of Classification Search ............ 445/49, 445/50, 51; 427/249.1, 249.3
See application file for complete search history.

(56) References Cited

U.S. PATENT DOCUMENTS

| | | | |
|---|---|---|---|
| 5,828,163 A | 10/1998 | Jones et al. | |
| 5,831,378 A | 11/1998 | Rolfson et al. | |
| 5,973,444 A | 10/1999 | Xu et al. | |
| 6,062,931 A | 5/2000 | Chuang et al. | |
| 6,133,678 A | 10/2000 | Kishino et al. | |
| 6,144,144 A | 11/2000 | Cleeves et al. | |
| 6,204,597 B1 | 3/2001 | Xie et al. | |
| 6,331,209 B1 * | 12/2001 | Jang et al. | 423/445 R |
| 6,515,415 B1 | 2/2003 | Han et al. | |
| 6,692,717 B1 * | 2/2004 | Smalley et al. | 423/445 R |
| 2002/0079802 A1 | 6/2002 | Inoue et al. | |
| 2004/0037972 A1 * | 2/2004 | Simon et al. | 427/249.1 |
| 2004/0108515 A1 * | 6/2004 | Muroyama et al. | 445/24 |

FOREIGN PATENT DOCUMENTS

| | | |
|---|---|---|
| EP | 1061043 A1 * | 12/2000 |
| JP | 2001020072 A * | 1/2001 |
| WO | WO/9965821 A1 | 12/1999 |
| WO | WO 200194260 A1 * | 12/2001 |

OTHER PUBLICATIONS

Search Report PCT/US03/26314.

* cited by examiner

*Primary Examiner*—Mariceli Santiago
(74) *Attorney, Agent, or Firm*—Fenwick & West LLP

(57) ABSTRACT

An electron-emitting device contains a vertical emitter electrode patterned into multiple laterally separated sections situated between the electron-emissive elements, on one hand, and a substrate, on the other hand. The electron-emissive elements comprising carbon nanotubes are grown at a temperature range of 300° C. to 500° C. compatible with the thermal stress of the underlying substrate. The electron-emissive elements are grown on a granulized catalyst layer that provides a large surface area for growing the electron-emissive elements at such low temperature ranges. To ensure growth uniformity of the carbon nanotubes, the granularized substrate is soaked in a pre-growth plasma gas to enhance the surface diffusion properties of the granularized substrate for carbon diffusion.

21 Claims, 10 Drawing Sheets

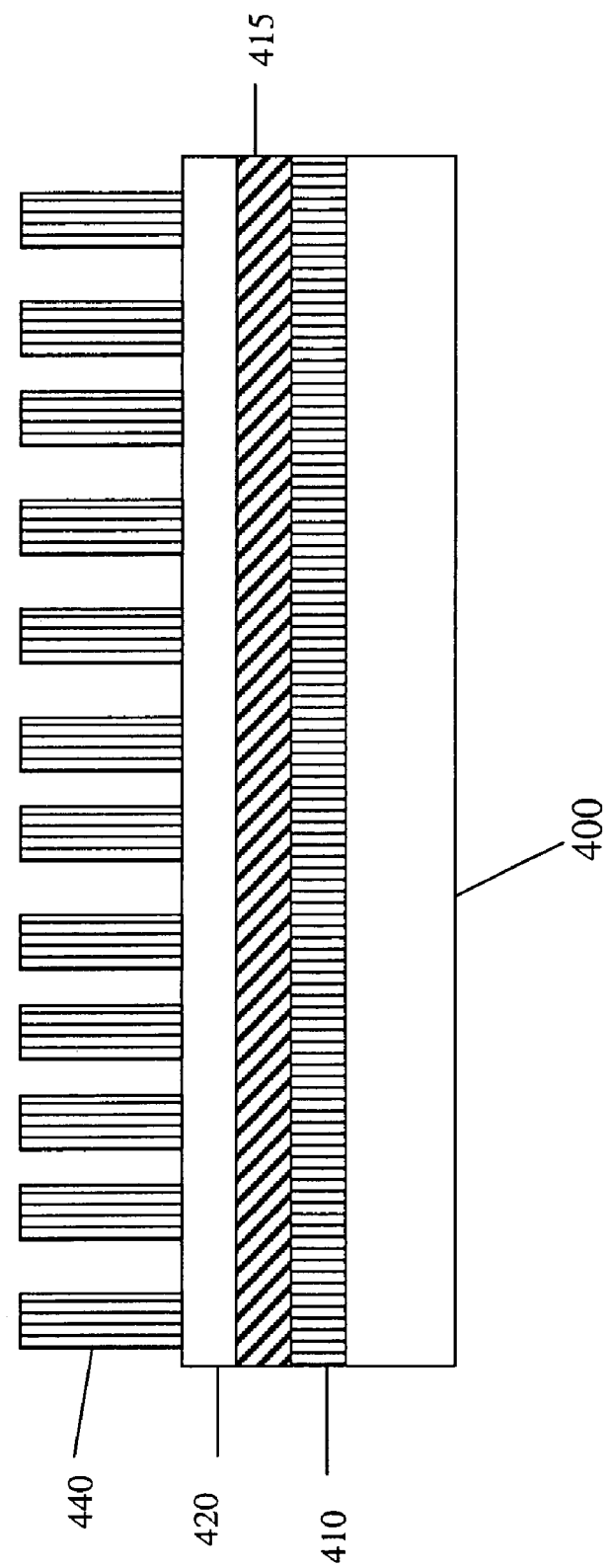

FORMING CARBON NANOTUBES AT LOWER TEMPERATURES SUITABLE FOR AN ELECTRON-EMITTING DEVICE

CROSS REFERENCE

This application is a continuation-in-part of U.S. application Ser. No. 10/226,873, filed Aug. 22, 2002, now abandoned which is incorporated herein by reference in its entirety.

FIELD OF USE

This invention relates to carbon nano tube based field emitters. More particularly, this invention relates to the structure and fabrication of an electron-emitting device in which electrically conductive material is situated between electron-emissive elements, on one hand, and emitter electrodes, on the other hand, and which is suitable for use in a flat-panel display of the cathode-ray tube ("CRT") type.

BACKGROUND

A Cathode Ray Tube (CRT) display generally provides the best brightness, highest contrast, best color quality and largest viewing angle of prior art computer displays. CRT displays typically use a layer of phosphor which is deposited on a thin glass faceplate. These CRTs generate a picture by using one to three electron beams which generate high energy electrons that are scanned across the phosphor in a raster pattern. The phosphor converts the electron energy into visible light so as to form the desired picture. However, prior art CRT displays are large and bulky due to the large vacuum envelopes that enclose the cathode and extend from the cathode to the faceplate of the display. Therefore, typically, other types of display technologies such as active matrix liquid crystal display, plasma display and electroluminescent display technologies have been used in the past to form thin displays.

Recently, a thin flat panel display (FPD) has been developed which uses the same process for generating pictures as is used in CRT devices. These flat panel displays use a backplate including a matrix structure of rows and columns of electrodes. One such flat panel display is described in U.S. Pat. No. 5,541,473 which is incorporated herein by reference. Flat panel displays are typically matrix-addressed and they comprise matrix addressing electrodes. The intersection of each row line and each column line in the matrix defines a pixel, the smallest addressable element in an electronic display.

The essence of electronic displays is the ability to turn on and off individually picture elements (pixels). A typical high information content display will have about a quarter million pixels in a 33 cm diagonal orthogonal array, each under individual control by the electronics. The pixel resolution is normally just at or below the resolving power of the eye. Thus, a good quality picture can be created from a pattern of activated pixels.

One means for generating arrays of field emission cathode structures relies on well established semiconductor microfabrication techniques. These techniques produce highly regular arrays of precisely shaped field emission tips. Lithography, generally used in these techniques, involves numerous processing steps, many of them wet. The number of tips per unit area, the size of the tips, and their spacing are determined by the available photo-resist and the exposing radiation.

Tips produced by the method are typically cone-shaped with base diameters on the order of 0.5 to 1 um, heights of anywhere from 0.5 to 2 um, tip radii of tens of nanometers. This size limits the number of tips per pixel possible for high-resolution displays, where large numbers (400–1000 emitters per pixel) are desirable for uniform emission to provide adequate gray levels, and to reduce the current density per tip for stability and long lifetimes. Maintaining two dimensional registry of the periodic tip arrays over large areas, such as large TV-sized screens, can also be a problem for gated field emission constructions by conventional means, resulting in poor yields and high costs.

U.S. Pat. No. 4,338,164 describes a method of preparing planar surfaces having a micro-structured protuberances thereon comprising a complicated series of steps involving irradiation of a soluble matrix (e.g., mica) with high energy ions, as from a heavy ion accelerator, to provide column-like traces in the matrix that are subsequently etched away to be later filled with an appropriate conductive, electron-emitting material. The original soluble material is then dissolved following additional metal deposition steps that provide a conductive substrate for the electron emitting material. The method is said to produce up to $10^6$ emitters per cm2, the emitters having a diameter of approximately 1–2 um.

U.S. Pat. No. 5,266,530 describes a gated electron field emitter prepared by a complicated series of deposition and etching steps on a substrate, preferably crystalline.

Carbon, the most important constituent element, which is combined with oxygen, hydrogen, nitrogen and the like, of all organisms including the human body, has four unique crystalline structures including diamond, graphite and carbon. Carbon nano-tubes can function as either a conductor or a semi-conductor according to the constituents of the tube. A conventional approach of fabricating carbon nanotubes is described in an article entitled "epitaxial carbon nanotube film self-organized by sublimation decomposition of silicon carbide" (Appl. Phys. Lett. Vol. 77, pp. 2620, 1997), by Michiko Kusunoky. In the conventional approach, the carbon nanotubes are produced at high temperatures by irradiating a laser onto a graphite silicon carbide. In this particular approach, the carbon nanotubes are produced from graphite at about 1200° C. or more and for silicon carbide at a temperature range of about 1600° C. to 1700° C. However, this method requires a multi-stage approach of deposition of the carbon material. This method is, from a manufacturing perspective, costly and cumbersome.

Another conventional approach is to grow the carbon nanotubes on a silicon substrate. This approach requires that the carbon nanotube material be deposited at temperature higher than 700° C. to ensure a purified and defect-free vertically aligned carbon nanotube structure.

Any attempt to grow the carbon nanotube structure at temperatures below 700° C. results in a defective structure. This conventional approach also results in the inability to control the height of the carbon structure.

Attempts to grow carbon nanotubes at lower temperatures in the prior art have further resulted in non-uniform and repetitive deposition of the emissive carbon nanotubes. Prior art attempts to grow carbon nanotubes have been unsuccessful due to the low surface diffusion of the underlying substrate with the carbon material used for growing the carbon nanotubes.

FIG. 1 is an illustration of a prior art carbon nanotube structure. The carbon nanotube structure shown in FIG. 1 comprises a silicon film substrate 11 with a catalyst metal layer 13 upon which carbon nanotube layer 15 is deposited. The catalyst layer 13 diffuses into the silicon layer 11 during the growing of the carbon nanotube layer 13. This results in a metal-induction crystallized polysilicon layer 14. The carbon nanotube layer 15 is grown by a plasma deposition and etching method at temperatures ranging from 700° C. to 1700° C. The plasma density in this approach ranges from a high density of $10^{11}$ cm$^3$ or more. In the structure in FIG. 1, the diffusion of the catalyst layer 13 into the silicon layer 11 results in a high amount of carbon material being deposited to form the nanotube structure.

FIG. 2 is another prior art structure in which the carbon nanotube is grown at a temperature lower than 700° C. In the structure shown in FIG. 2, the carbon nanotube formed is defective and it is difficult to control the height of the structure resulting in a "spaghetti" like structure being formed. The resulting structure of the carbon nanotube in FIG. 2 is due to the insufficient surface temperature characteristics of the silicon substrate at lower temperatures, the lower driving energy to grow the nanotubes and the dramatic growth of the nanotubes at a lower temperature within a short period of time.

SUMMARY DISCLOSURE OF THE INVENTION

The present invention furnishes an electron-emitting device having a granularized catalyst layer patterned to meet enable the growth and curing of carbon nanotube structures on glass substrates at temperatures lower than 500° C. The present invention provides a less complicated series of deposition steps to fabricate a carbon nanotubes emitter based display device. The present granularized catalyst layer contains multiple laterally separated sections situated between electron emitting carbon nanotube, on one hand, and underlying emitter electrodes, on the other hand. The sections of the catalyst layer are spaced apart along each emitter electrode.

The catalyst sections underlie control electrodes of the present electron-emitting device in various ways. In one general embodiment, the catalyst sections are basically configured as strips situated below the carbon nanotubes. Each granular of catalyst strip is sufficiently long to extend over at least two, typically all, of the emitter electrodes.

In another general embodiment of the granular catalyst layers are formed on a glass substrate and the carbon nanotubes are formed on the catalyst layer at a temperature of about 500° C. conductive layer. An anti-diffusion barrier layer is also interlaced between the granular catalyst layer and other layers including a resistive layer in order to ensure a defect free carbon nanotube formation.

Embodiments of the present invention include soaking the granular catalyst layer in a hydro-carbon containing gas prior to growing the carbon nanotubes on the substrate. Soaking the granularized catalyst layer enhances the diffusion characteristics of the catalyst material with the carbon material used in growing the nanotubes.

Embodiments of the carbon nanotubes structure of the present invention use a plasma chemical vapor deposition system for the dissociation of hydrocarbon gas at a temperature range of 300° C. to 500° C. to grow the carbon nanotube structures. A post growth treatment of the carbon nanotube structures is further performed to control the height of the structures in a plasma environment and to ensure defect free structures.

BRIEF DESCRIPTION OF THE DRAWINGS

FIGS. 4a–4g are cross-sectional structural views representing steps in manufacturing an embodiment of the carbon nanotube device of FIG. 3 according to the invention.

Like reference symbols are employed in the drawings and in the description of the preferred embodiments to represent the same, or very similar, item or items.

DESCRIPTION OF THE PREFERRED EMBODIMENTS

In the present invention, a vertical conductor connected in series with electron-emissive elements of an electron-emitting device is patterned into multiple sections laterally separated along each emitter electrode in the device. The electron emitter of the invention typically operates according to field-emission principles in producing electrons that cause visible light to be emitted from corresponding light-emissive phosphor elements of a light-emitting device. The combination of the electron-emitting device, often referred to as a field emitter, and the light-emitting device forms a cathode-ray tube of a flat-panel display such as a flat-panel television or a flat-panel video monitor for a personal computer, a lap-top computer, or a workstation.

In the following description, the term "electrically insulating" (or "dielectric") generally applies to materials having a resistivity greater than $10^{10}$ ohm-cm. The term "electrically non-insulating" thus refers to materials having a resistivity below $10^{10}$ ohm-cm. Electrically non-insulating materials are divided into (a) electrically conductive materials for which the resistivity is less than 1 ohm-cm and (b) electrically resistive materials for which the resistivity is in the range of 1 ohm-cm to $10^{10}$ ohm-cm. These categories are determined at an electric field of no more than 1 volt/μm.

Examples of electrically conductive materials (or electrical conductors) are metals, metal-semiconductor compounds (such as metal silicides), and metal-semiconductor eutectics. Electrically conductive materials also include semiconductors doped (n-type or p-type) to a moderate or high level. The semiconductors may be of the monocrystalline, multicrystalline, polycrystalline, or amorphous type.

Electrically resistive materials include (a) metal-insulator composites such as cermet, (b) certain silicon-carbon compounds such as silicon carbide and silicon-carbon-nitrogen, (c) forms of carbon such as graphite, amorphous carbon, and modified (e.g., doped or laser-modified) diamond, and (d) semiconductor-ceramic composites. Further examples of electrically resistive materials are intrinsic and lightly doped (n-type or p-type) semiconductors.

As used below, an upright trapezoid is a trapezoid whose base (a) extends perpendicular to the direction taken as the vertical, (b) extends parallel to the top side, and (c) is longer than the top side. A transverse profile is a vertical cross section through a plane perpendicular to the length of an elongated region. The row direction in a matrix-addressed field emitter for a flat-panel display is the direction in which the rows of picture elements (pixels) extend. The column direction is the direction in which the columns of pixels extend and runs perpendicular to the row direction.

Figure 1:
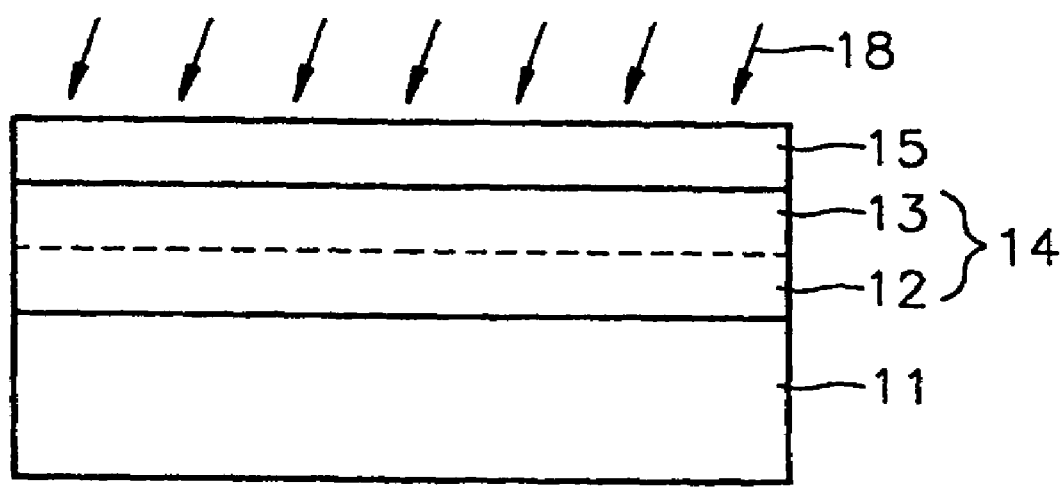
FIG. 1 is a cross-sectional view of the core of a conventional carbon nanotube device.
Figure 2:
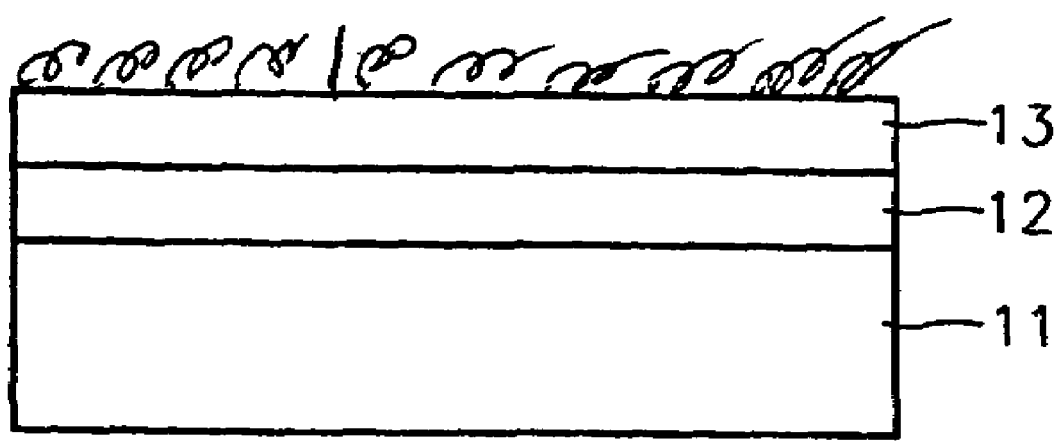
FIG. 2 is a cross-sectional structural view of a conventional carbon nanotube structure formed at a lower temperature range.
Figure 3:
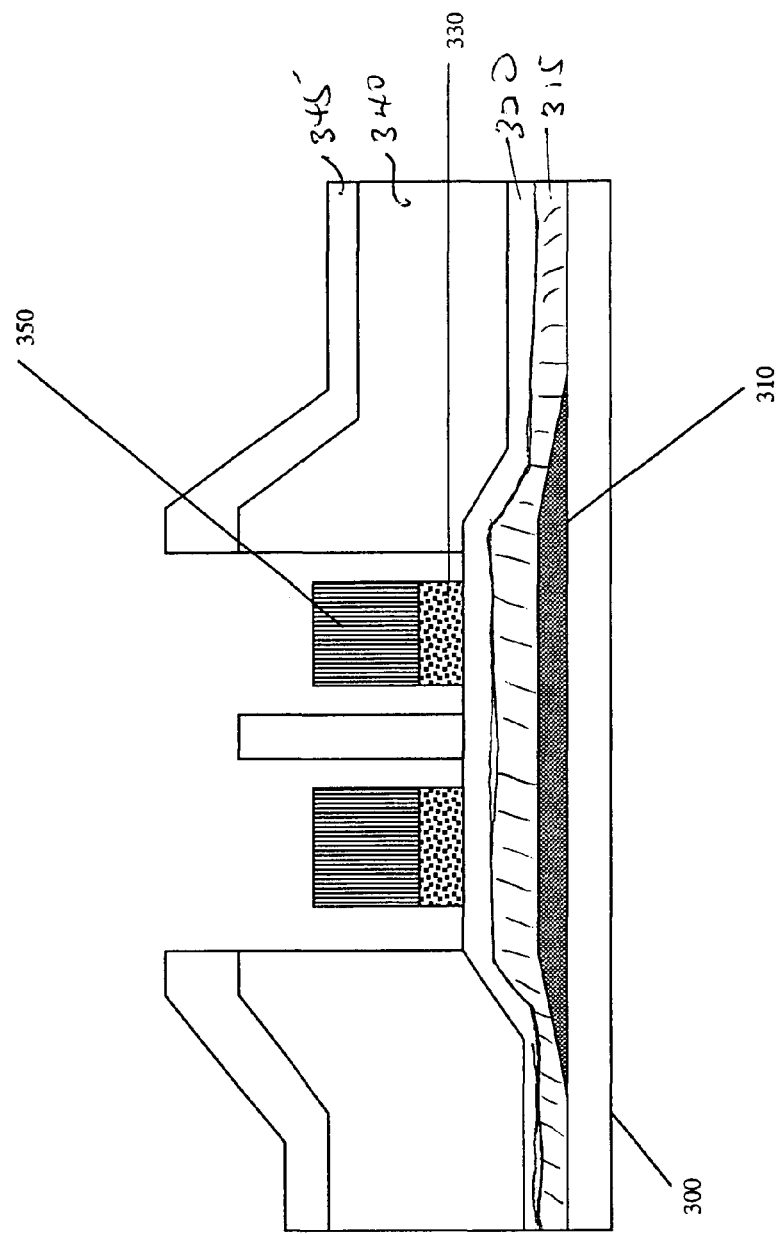
FIG. 3 is cross-sectional view of the core of a carbon nanotube device in accordance with the present invention.

FIG. 3 illustrates the core of a matrix-addressed field emitter that contains a vertical emitter conductor patterned into conductor strips in a vertically aligned manner according to the invention. The cross sections of FIG. 3 is taken through perpendicular planes. The field emitter of FIG. 3 is created from a flat electrically insulating base-plate (substrate) 300 typically consisting of glass. In one embodiment of the present invention, the glass is less than 1.5 mm and preferably with a CTE of less than 80. To simplify the pictorial illustration, base-plate 300 is not shown in the perspective view of FIG. 3.

A group of generally parallel emitter electrodes 310 are situated on base-plate 300. Emitter electrodes 310 extend in the row direction and constitute row electrodes. Each emitter electrode 310 has a transverse profile roughly in the shape of an upright isosceles trapezoid. This profile helps improve step coverage of layers formed above emitter electrodes 310. A buffer layer 320 is disposed on the emitter electrode 310 to serve as a buffer between the carbon nanotube emission elements 350 and the catalyst layer 330. In one embodiment of the present invention, the carbon nanotube emission elements 350 are grown at a temperature range of 300° C. to 500° C. suitable for the thermal stress of the substrate 300.

In one embodiment of the present invention, the substrate 300 is exposed to a prior carbon nanotubes growth soaking gas. Soaking the substrate in a hydro-carbon containing gas prior to growing the carbon nanotubes enhances the diffusion rate of carbon into a catalyst layer disposed on the substrate 300 and results in a uniform and repetitive growth of the carbon nanotubes on the substrate 300.

Referring to FIGS. 4A–4G, a substrate for use in the formation of the carbon nanotubes display device according to an embodiment of the present invention is shown. An emitter electrode 410 is formed on the substrate 400. A resistor layer 415 is formed over the emitter electrode 410. In the preferred embodiment of the present invention, the substrate 400 is glass. In one embodiment of the present invention, the substrate 400 is ceramic or quartz.

A buffer layer 420 is subsequently disposed on the emitter electrode 410 after a resistor layer 415 is formed on the emitter electrode layer 410. The buffer layer 420 serves as an anti-diffusion layer for a catalyst layer 430 upon which the carbon nanotubes are formed. In one embodiment of the present invention, the buffer layer 420 may be formed of a metal. In one embodiment, the metal may be molybdenum. In another embodiment, the metal may be titanium, titanium tungsten or titanium nitride. In one embodiment of the present invention, the buffer layer 420 may be an alloy of titanium, titanium tungsten, tungsten or molybdenum.

The catalyst layer 430 is subsequently formed over the buffer layer 420. In one embodiment of the present invention, the catalyst layer 430 is formed by a sputtering deposition process. In one embodiment of the present invention, the catalyst layer 430 comprises either Ni, Cu or Fe and is deposited to a thickness of about 1 nm to 100 nm.

After deposition of the catalyst layer 430, the substrate 400 is placed in a plasma chamber (not shown). The substrate 400 is then heated to a temperature range of about 300° C. to 500° C. In the one embodiment of the present invention, a hydro-carbon containing gas is gradually released to soak the catalyst layer 430.

Figure 4A:
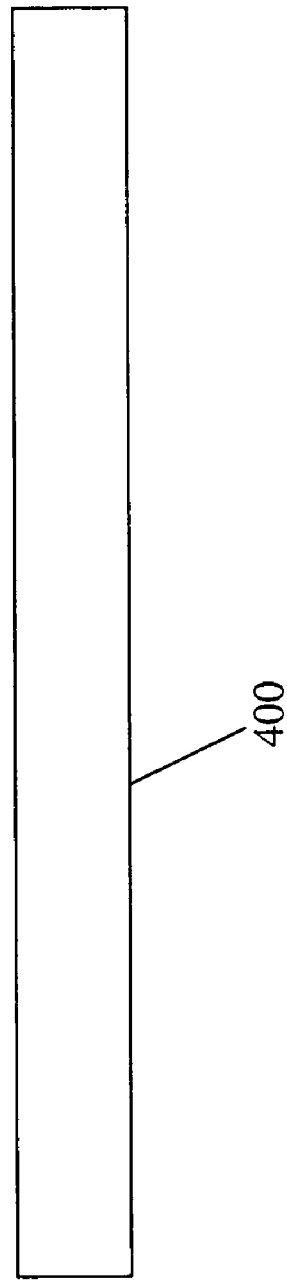
Figure 4B:
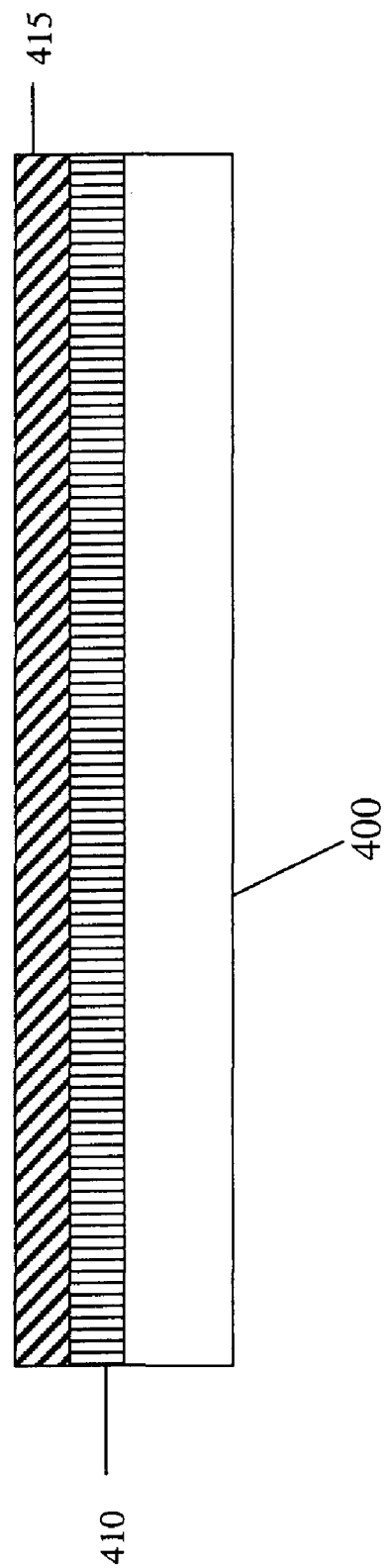
Figure 4C:
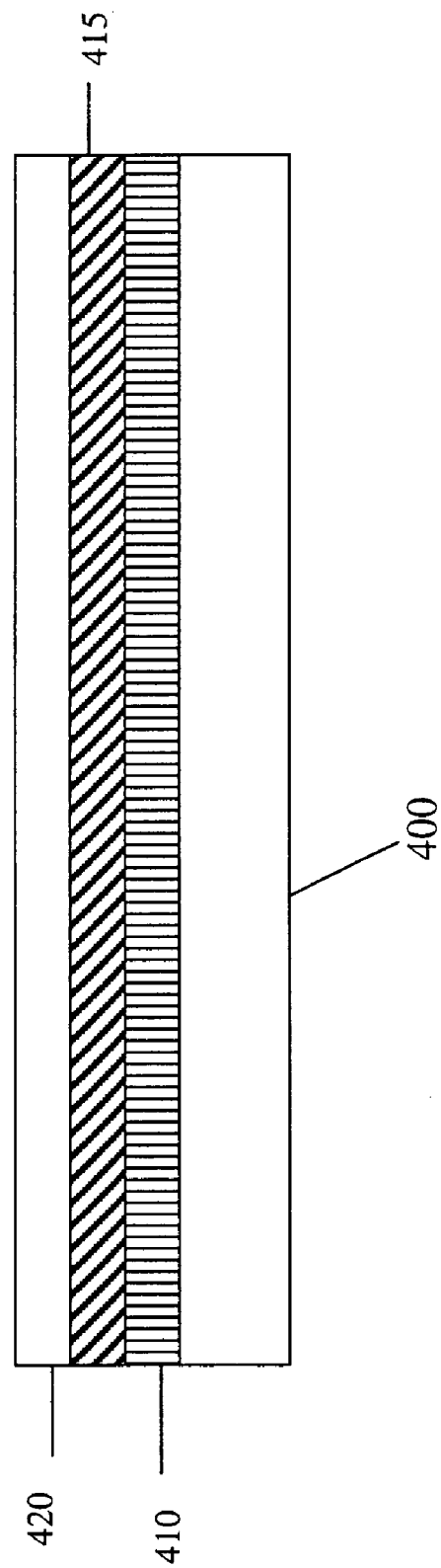
Figure 4D:
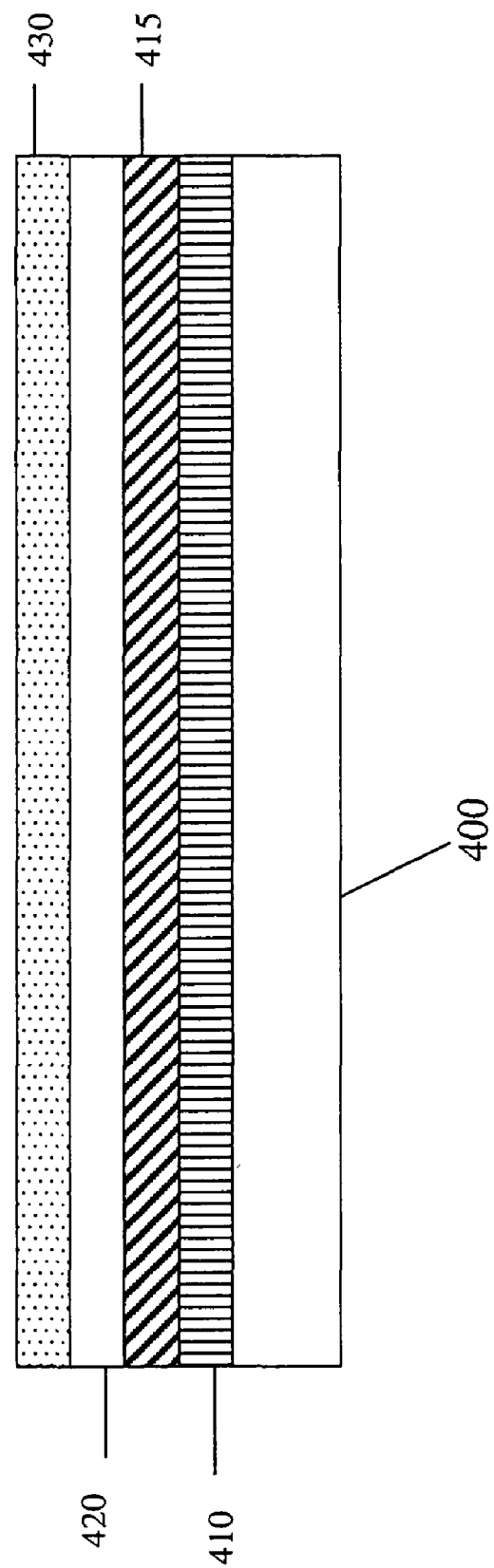
Figure 4E:
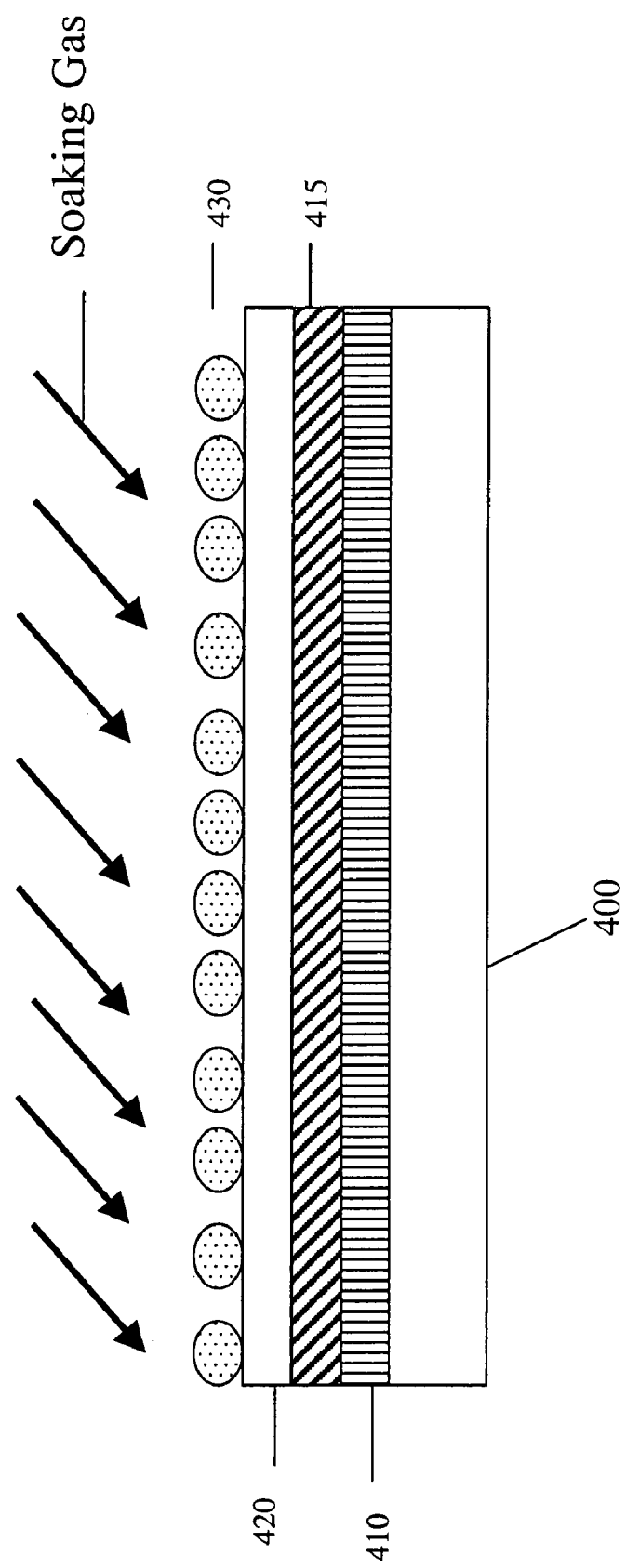

In one embodiment the hydro-carbon containing gas may be $C_2H_2$, or $CH_4+NH_3$. In the present invention, the temperature of the substrate 400 is maintained at between 300° C. to 500° C. in a plasma gas environment. The catalyst layer 430 is then treated and granularized into nano size particles as shown in FIG. 4D.

In the granulation process, the substrate is exposed to granulation plasma gas to patterned the catalyst layer 430 to nano particles. In one embodiment of the present invention, the granulation process is performed in a vacuum process chamber in order to prevent the catalyst layer 430 from being contaminated by atmospheric gases. In the granulation process, the catalyst layer 430 is exposed to a hydride gas plasma and the catalyst layer 430 is granularised into multiple round shapes that randomly spread over the buffer layer 420. Having round shaped nano particles enhances the density of carbon nanotube formed on each catalyst particle.

In one embodiment of the present invention, the granule size of the catalyst particles may range from 1 nm to 200 nm. In one embodiment of the present invention, during the granulation process, the reaction surface of the catalyst layer 430 is increased to a three dimensional surface through the round shape catalyst particles. The three dimensional surface of the catalyst particles enhances the growing of the carbon nanotubes. The three dimensional surface of the catalyst particles also helps in the diffusion of the carbon nanotubes to the catalyst layer 430. This helps reduce the temperature at which the carbon nanotubes may be formed.

After the granulation process, the substrate 400 is exposed to a slow flowing hydro-carbon containing gas for a period of approximately 1 min–30 mins and the gas density is maintained at $10^{10}$–$10^{12}$ cm$^{-3}$ in the plasma chamber to soak the catalyst layer 430 in a vacuum environment prior to growing the carbon nanotubes. In one embodiment of the present invention, the soaking gas is the same as the gas used in growing the carbon nanotubes with the plasma gas. In one embodiment of the present invention, the catalyst layer 430 is soaked for about one minute. Soaking the catalyst layer 430 enhances the diffusion properties of the granularized catalyst layer 430 to enable uniform growth of the carbon nanotubes and the ability to repeat the same growing characteristics of the carbon nanotubes, such as controlling the density and height of the carbon nanotubes grown on the catalyst layer 430.

Figure 4F:
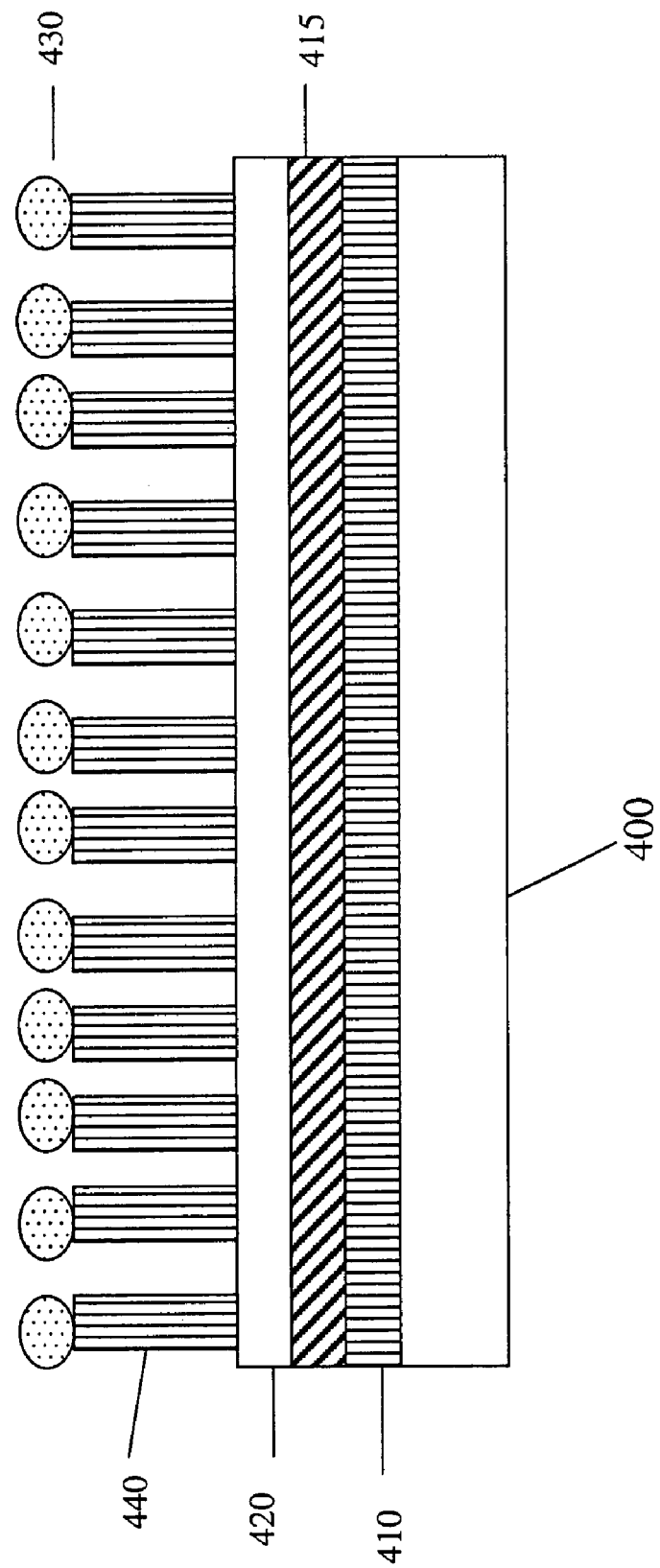

After the soaking process of the catalyst layer 430, the carbon nanotubes 440 are grown as illustrated in FIG. 4F. During the growing of the carbon nanotubes 440, a hydro-carbon series gas may be used as a plasma source with $NH_3$ or $H_2$ additive gas.

In one embodiment of the present invention, the plasma source gas for growing the carbon nanotubes 440 may be one of $CH_4$ and $C_2H_2$. The additive gas NH3 or H2 is added to remove the amorphous carbon contaminants during the growing of the carbon nanotubes 450. The temperature range of the substrate 400 during the growing of the carbon nanotubes 450 ranges between 300° C. to 500° C. and the plasma gas pressure ranges between 0.5 to 10 Torr. In one embodiment of the present invention, a DC bias is applied to the substrate 400 to improve the vertical growth and density of the carbon nanotubes 450. After the carbon nanotubes 400 are grown, the granular particles of the catalyst layer 430 are substantially removed at FIG. 4G.

We claim:

1. A method for forming carbon nanotubes for an electron-emitting device, comprising:
    granularizing a catalyst layer to generate nano-sized granules for growing a plurality of carbon nanotubes;
    soaking the granularized catalyst layer in a soaking gas before growing the plurality of carbon nanotubes to enhance diffusion properties of the granularized catalyst layer; and
    growing the plurality of carbon nanotubes by exposing the catalyst layer to a plasma source gas.

2. The method of claim 1, wherein the soaking gas is a hydrocarbon-containing gas.

3. The method of claim 1, wherein the catalyst layer is soaked in the soaking gas in a temperature range of 300° C. to 500° C.

4. The method of claim 1, wherein said catalyst layer is soaked in a vacuum environment.

5. The method of claim 1, wherein the plasma source gas comprises $CH_4$.

6. The method of claim 1, wherein the soaking gas comprises $C_2H_2$.

7. The method of claim 1, wherein the plasma source gas is selected from a group consisting of: $CH_4$ and $C_2H_2$.

8. The method of claim 1, wherein the plasma source gas includes an additive gas that improves the quality of the plurality of carbon nanotubes formed on the catalyst layer.

9. The method of claim 1, wherein the plasma source gas is provided by a capacitively coupled plasma source.

10. The method of claim 1, wherein the plasma source gas is provided by an inductively coupled plasma source.

11. The method of claim 1, wherein the plasma source gas is provided by a microwave plasma source.

12. The method of claim 8, wherein the additive gas comprises $NH_3$.

13. The method of claim 8, wherein the additive gas comprises $H_2$.

14. The method of claim 1, wherein the catalyst layer is disposed on a glass substrate.

15. The method of claim 1, wherein the catalyst layer is soaked in the soaking gas for approximately 1 to 30 minutes.

16. The method of claim 1, wherein soaking the catalyst layer in the soaking gas comprises exposing the catalyst layer to a flow of the soaking gas over the catalyst layer.

17. The method of claim 1, wherein the soaking gas is the same gas used in the growing of the carbon nanotubes.

18. The method of claim 1, wherein the soaking gas is maintained at a density of $10^{10}$ to $10^{12}$ $cm^{-3}$ while soaking the catalyst layer in the soaking gas.

19. The method of claim 1, wherein the plurality of carbon nanotubes are formed using a plasma chemical vapor deposition process and a plasma pressure of 0.5 Torr to 10 Torr.

20. The method of claim 1, wherein the growing is performed without flushing the soaking gas from the granularized catalyst layer.

21. The method of claim 1, wherein the carbon nanotubes are grown on a substrate and are suitable for an electron-emitting device.

* * * * *